United States
Mori

[11] 4,176,915
[45] Dec. 4, 1979

[54] WIDE ANGLE LENS

[75] Inventor: Ikuo Mori, Kawasaki, Japan

[73] Assignee: Nippon Kogaku K.K., Tokyo, Japan

[21] Appl. No.: 845,632

[22] Filed: Oct. 26, 1977

[30] Foreign Application Priority Data

Nov. 2, 1976 [JP] Japan .................... 51/131221

[51] Int. Cl.² .............................................. G02B 9/58
[52] U.S. Cl. .................................. 350/220; 350/176; 350/177
[58] Field of Search ................... 350/220, 176, 177

[56] References Cited
U.S. PATENT DOCUMENTS 4,033,675  7/1977  Terasawa et al. ............... 350/216

FOREIGN PATENT DOCUMENTS 1029071  5/1966  United Kingdom ............... 350/220
1095767  12/1967  United Kingdom ............... 350/220

Primary Examiner—Paul A. Sacher
Attorney, Agent, or Firm—Fitzpatrick, Cella, Harper & Scinto

[57] ABSTRACT

A wide angle lens comprises four lens components, which are, in order from the object side, a divergent first element consisting of a negative meniscus lens having its convex surface facing the object side, a compositely convergent second component consisting of a plurality of lens elements including a biconvex lens element on the object side thereof, the center thickness of the biconvex lens of the second component being greater than the separation between the first and the second components, a compositely convergent third components consisting of a plurality of lens elements, and a divergent fourth components consisting of a negative meniscus lens element having its convex surface facing the image side, the separation between the fourth and the third components being less than that between the first and the second components.

6 Claims, 3 Drawing Figures

WIDE ANGLE LENS

BACKGROUND OF THE INVENTION

1. Field of the Invention

This invention relates to a wide angle lens suitable as the picture-taking lens in a large camera, for example, of 4"×5" size.

2. Description of the Prior Art

In order that distortion, curvature of image field, etc. may be well corrected over an angle of view of 100° or more, it is usually necessary to adopt a lens arrangement in which lens components are symmetrically disposed with a diaphragm interposed therebetween. As is well known, symmetrical arrangements have long since been achieved by L. Bertele. However, conventional lens arrangements of this kind have suffered from the problem that the concave lens components on the opposite outer sides tend to be bulky for the purpose of well correcting the various aberrations. More particularly, increasing the size of the divergent lens component on the image size has resulted in the disadvantage that when swing-and-tilting photography is effected with the lens mounted on a large camera, the rearmost portion of the lens touches the bellows due to the mechanism of the camera or, if not so, the marginal rays are greatly cut off or vignetting occurs to make the swing-and-tilting photograph impossible. In lenses for large cameras, it is therefore desirable to contemplate that the lens arrangement be reduced in size and the effective diameter, especially of the rearmost lens (exactly, the effective diameter of the rearmost lens surface on the tangential plane) be minimized. Also, for various reasons such as avoiding out-of-focus effects resulting from the instability of the film surface which is frequently experienced with large cameras, it is often the case with these lenses that they are used with a small aperture, whereas it is desirable to maintain the relative aperture as great as possible in order also to ensure that focusing may be accomplished with ease and accuracy.

SUMMARY OF THE INVENTION

I have conceived and contribute by the present invention a wide angle lens by which I am able to satisfy all of the above-noted requirements and which, while simple in construction and of small size, has well corrected the various aberrations.

According to the present invention, the wide angle lens comprises, in order, from the object side, a divergent first component consisting of a negative meniscus lens element having its convex surface facing the object side, a compositely convergent second component including a biconvex lens element on the object side thereof and consisting of a plurality of lens elements, the center thickness of the biconvex lens of the second component being greater than the separation between the first and the second components, a compositely convergent third component consisting of a plurality of lens elements, and a divergent fourth component consisting of a negative meniscus lens element having its convex surface facing the image side, the separation between the fourth and the third components being less than that between the first and the second components.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
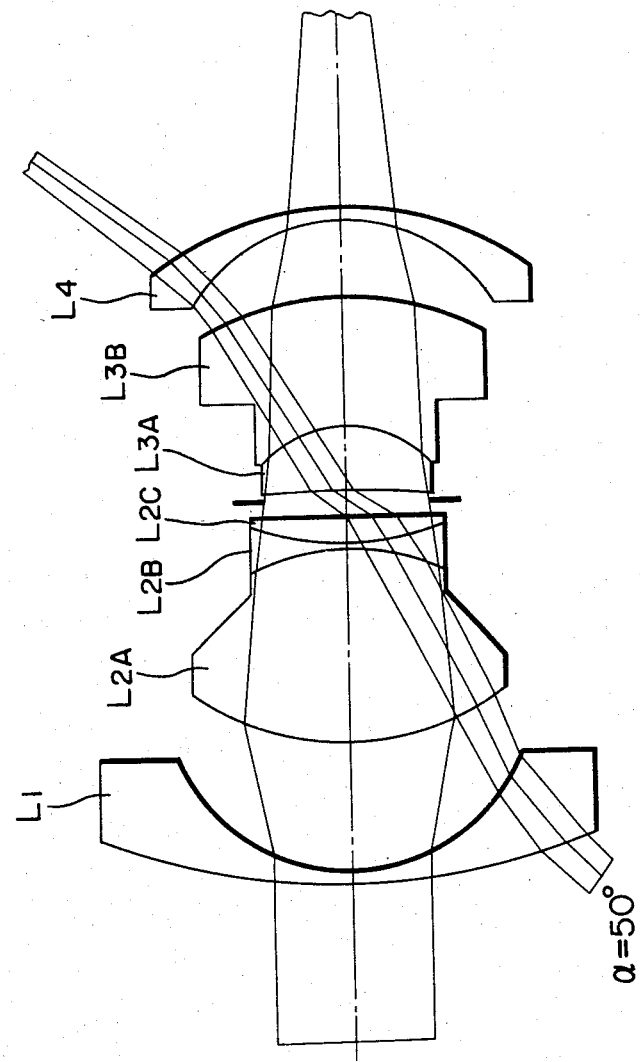
FIG. 1 is a view showing the construction of a lens according to the present invention.
Figure 2:
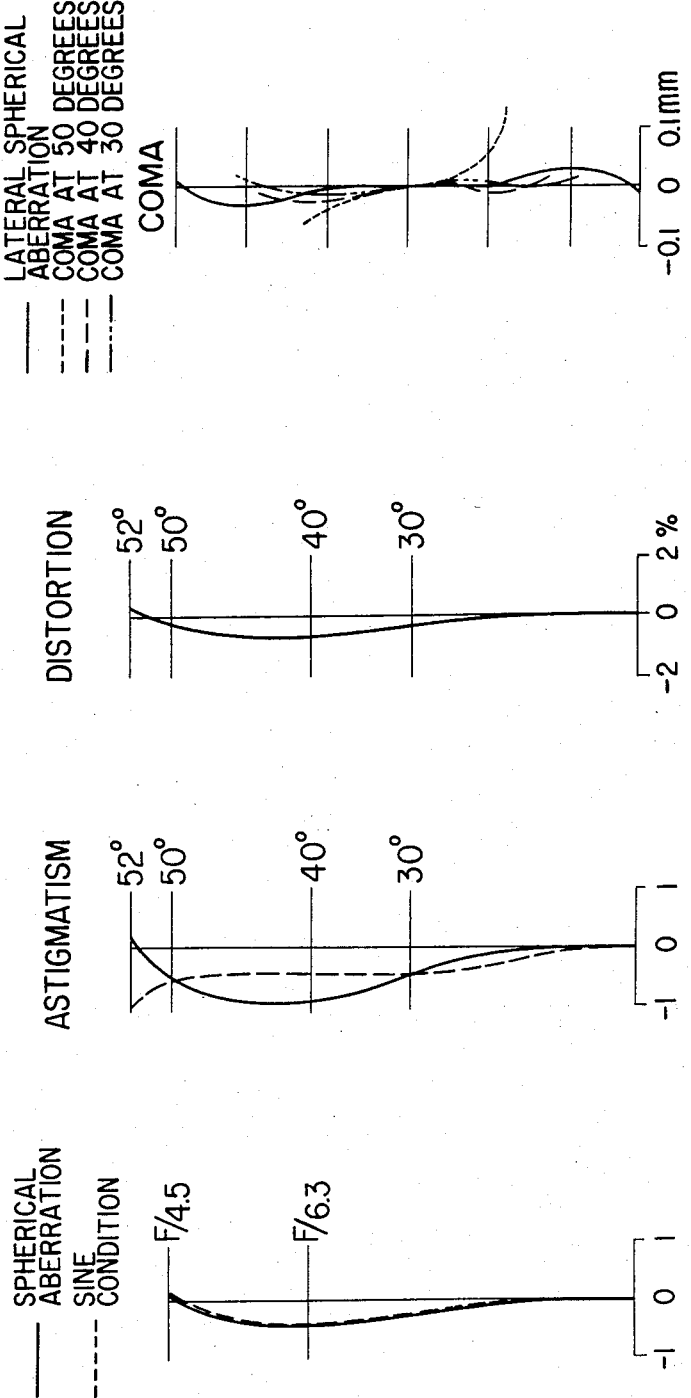
FIGS. 2 and 3 illustrate the various aberrations in a first and a second embodiment of the present invention.

As shown in FIG. 1, the wide angle lens according to the present invention comprises, in order from the object side, a first component L1 consisting of a negative meniscus lens element having its convex surface facing the object side, a second component L2 consisting of three lens elements cemented together, namely, a biconvex lens element L2A, a biconcave lens element L2B and a positive lens element L2C, the second component compositely having a positive power, a diaphragm 10, a third component L3 consisting of two lens elements cemented together, namely, a positive lens element L3A and a meniscus lens element L3B having its convex surface facing the image side, the third component compositely having a positive power, and a fourth component L4 consisting of a negative meniscus lens element having its convex surface facing the image side, and satisfies the following conditions:

$$d_9 < d_2 \quad (1)$$

$$d_3 > d_2 \quad (2)$$

$$n_2 > n_3 \quad (3)$$

wherein $d_1, d_2, \ldots, d_{10}$ represent the center thicknesses of and separations between the successive lens elements, and $n_1, n_2, \ldots, n_7$ represent the refractive indices of the glasses forming the respective lens elements.

Significances of these limiting conditions will hereinafter be described. To reduce the effective diameter of the fourth element L4 closest to the image side, the present invention first provides condition (1) and achieves this intended purpose. This condition destroys the symmetry of the lens and is not preferable from the viewpoint of lens performance, and it seriously aggravates the various aberrations of off-axial rays. However, such means should unavoidably be adopted in order to expand the possibility of swing-and-tilting photography and enable such photography to be accomplished effectively. Should this condition (1) be departed from, the swing-and-tilting photography using the conventional bellows would necessarily be limited because vignetting would occur. The aberration which will be most affected by the condition (1) being satisfied will be astigmatism, especially aggravation of the meridional plane.

Moreover, the off-axial lateral aberration is closely related thereto and no good correction of the lateral aberration can be provided without good correction of the meridional plane. Condition (2) is the means for improving these corrections which are aggravated by condition (1). Thus, of the three lens elements forming the second component, the center thickness $d_3$ of the biconvex lens element L2A which is closest to the object side is made greater than the separation $d_2$ between the first component L1 and the second component L2, thereby enabling the correction of the meridional plane. Should this condition be departed from, good correction of the curvature of the meridional plane will be difficult.

To increase the relative aperture while following these conditions, the second component L2 is constructed as described above and condition (3) is imposed on both of the lenses L2A and L2B. Condition (3) concerns the refractive index and intends to impart a converging action to the joint surface of the lens elements L2A and L2B, thereby enabling the spherical aberration to be well corrected. If this condition is departed from, the spherical aberration will be greatly aggravated and the relative aperture will be about 1:8 at best. This condition is also effective for the correction of distortion. To increase the relative aperture, it is further desirable that the curvature radius $r_4$ of the image side surface of the biconvex lens element L2A of the second component L2 satisfy the condition $|r_4| < r_3$, where $r_3$ is the curvature radius of the object side surface of this lens. Thus, good correction of the spherical aberration and of the lateral aberration of oblique rays may become easier.

As regards the axial and off-axial chromatic aberrations, the respective lens elements of the component L2 and the component L3 should desirably satisfy the conditions that $vd_2 > vd_3 < vd_4$ and $vd_5 > vd_6$, whereby good correction of these aberrations becomes easy. In these conditions, $vd_i$ represents the Abbe number for d-line of the glass of the ith lens element from the object side.

By constructing the fourth group in the manner as described above and imposing conditions (1), (2) and (3), there is provided a small-sized wide angle lens of simple construction having a great aperture and which enables swing-and-tilting photography to be accomplished effectively over a wide range and in which the various aberrations have been well corrected. More specifically, where the total focal length of the entire system is f, there has been obtained a lens having a minimum filter diameter of 0.9 f to 1.1 f and in which the effective diameter of the lens component closest to the image side is of the order of 0.55 f and the relative aperture reaches the maximum of 1:4.

Alternatively, in accordance with the convenience for the correction of aberrations or for the manufacture, the third component L3 may be formed by cementing together three lens components or by dividing the element into two lens elements, thereby providing a wide angle lens similar to that of the present invention.

Figure 3:
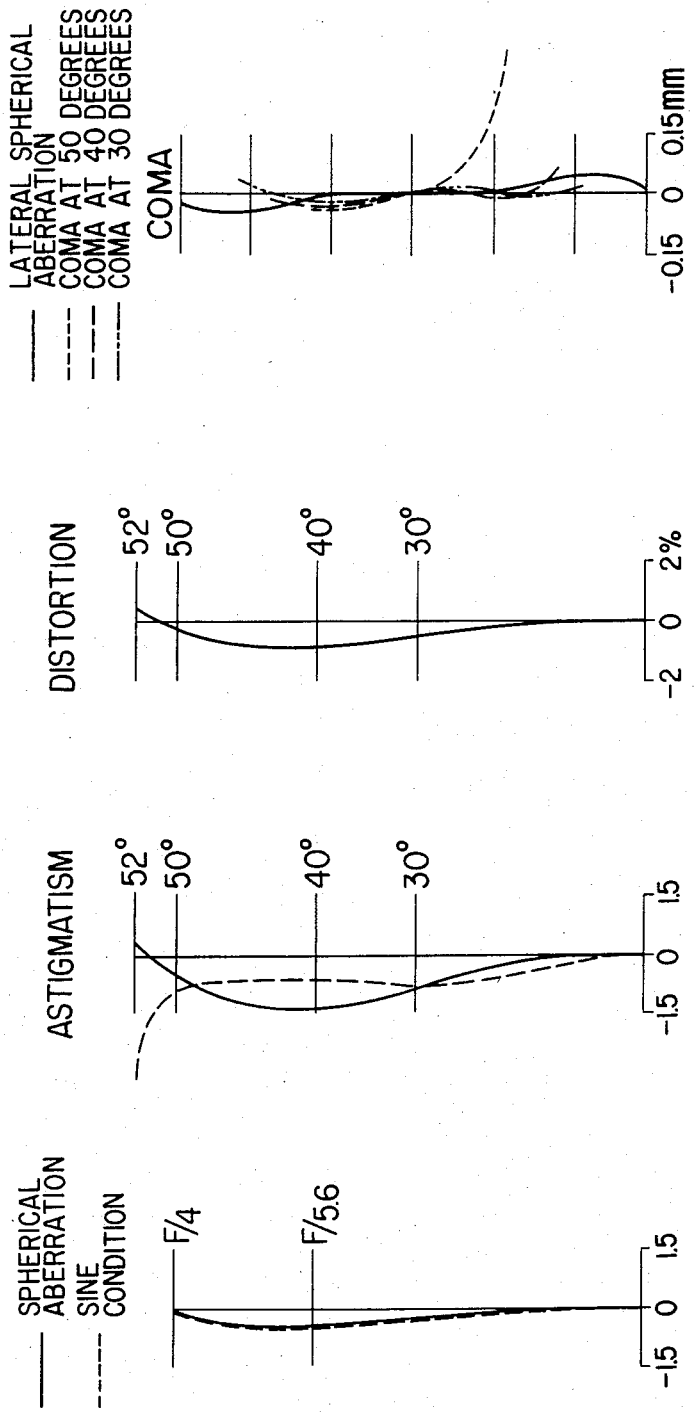

Preferred examples of the present invention will be shown below with their respective numerical data. The various aberrations in Examples 1 and 3 are illustrated in FIGS. 3 and 4. In the tables of numerical data below, $r_1, r_2, \ldots, r_{11}$ represent the curvature radii of the successive lens surfaces in order from the object side, $d_1, d_2, \ldots, d_{10}$ represent the center thicknesses of and separations between the successive lens elements, $nd_1, nd_2, \ldots, nd_7$ and $vd_1, vd_2, \ldots, vd_7$ respectively represent the refractive indices for d-line and Abbe numbers of the successive lens elements. To show that the lens is of a small size, there is also given the distance $\Sigma d$ from the foremost lens surface to the rearmost lens surface ($\Sigma d = d_1 + d_2 + \ldots + d_{10}$).

EXAMPLE 1

| total focal length: f = 100 | | aperture ratio 1:4.5 | |
|---|---|---|---|
| back focal distance: Bf = 69.673 | | | |
| r1 = 106.395 | d1 = 1.76 | nd1 = 1.57250 | vd1 = 57.5 |
| r2 = 26.461 | | | |
| | d2 = 17.86 | | |
| r3 = 35.943 | d3 = 27.23 | nd2 = 1.80218 | vd2 = 44.4 |
| r4 = −31.610 | d4 = 0.88 | nd3 = 1.67163 | vd3 = 38.8 |
| r5 = 45.204 | d5 = 3.31 | nd4 = 1.52000 | vd4 = 70.1 |
| r6 = 2425.579 | | | |
| | d6 = 3.64 | | |
| r7 = −254.686 | d7 = 9.37 | nd5 = 1.60717 | vd5 = 40.2 |
| r8 = −16.406 | d8 = 17.31 | nd6 = 1.71736 | vd6 = 29.5 |
| r9 = −45.424 | | | |
| | d9 = 11.03 | | |
| r10 = −25.391 | d10 = 1.65 | nd7 = 1.73350 | vd7 = 51.0 |
| r11 = −44.543 | $\Sigma d$ = 94.04 | | |

EXAMPLE 2

| total focal length: f = 100 | | aperture ratio 1:4.5 | |
|---|---|---|---|
| back focal distance: Bf = 69.238 | | | |
| r1 = 108.684 | d1 = 1.97 | nd1 = 1.57250 | vd1 = 57.5 |
| r2 = 26.711 | | | |
| | d2 = 17.50 | | |
| r3 = 35.921 | d3 = 26.97 | nd2 = 1.80218 | vd2 = 44.4 |
| r4 = −32.868 | d4 = 0.92 | nd3 = 1.67163 | vd3 = 38.8 |
| r5 = 45.132 | d5 = 3.42 | nd4 = 1.52000 | vd4 = 70.1 |
| r6 = 1644.737 | | | |
| | d6 = 4.21 | | |
| r7 = −271.053 | d7 = 9.21 | nd5 = 1.60717 | vd5 = 40.2 |
| r8 = −16.487 | d8 = 17.37 | nd6 = 1.71736 | vd6 = 29.5 |
| r9 = −46.184 | | | |
| | d9 = 11.05 | | |
| r10 = −25.645 | d10 = 1.97 | nd7 = 1.73350 | vd7 = 51.0 |
| r11 = −43.786 | $\Sigma d$ = 94.57 | | |

EXAMPLE 3

| total focal length: f = 100 | | aperture ratio 1:4.0 | |
|---|---|---|---|
| back focal distance: Bf = 70.197 | | | |
| r1 = 114.091 | d1 = 2.42 | nd1 = 1.56883 | vd1 = 56.0 |
| r2 = 28.333 | | | |
| | d2 = 19.09 | | |
| r3 = 37.348 | d3 = 28.03 | nd2 = 1.80218 | vd2 = 44.4 |
| r4 = −35.515 | d4 = 1.06 | nd3 = 1.67163 | vd3 = 38.8 |
| r5 = 45.455 | d5 = 3.79 | nd4 = 1.52000 | vd4 = 70.1 |
| r6 = 939.394 | | | |
| | d6 = 4.70 | | |
| r7 = −351.515 | d7 = 7.58 | nd5 = 1.56732 | vd5 = 42.8 |
| r8 = −18.121 | d8 = 18.33 | nd6 = 1.69895 | vd6 = 30.0 |
| r9 = −46.061 | | | |
| | d9 = 10.53 | | |
| r10 = −25.348 | d10 = 2.27 | nd7 = 1.58267 | vd7 = 46.5 |
| r11 = −46.874 | $\Sigma d$ = 97.8 | | |

I believe that the construction and operation of my novel wide angle lens will now be understood and that the advantages thereof will be fully appreciated by those persons skilled in the art.

I claim:

1. A wide angle lens comprising, in the order from the object side;

a divergent first component consisting of a negative meniscus lens element having its convex surface facing the object side, a compositely convergent second component consisting of three lens elements cemented together and which are in the order from the object side, a biconvex lens element, biconcave lens element and a positive lens element, the center thickness of said biconvex lens element of said second component being greater than the separation between said first and said second components, a compositely convergent third component consisting of two lens elements and which are in the order from the object side, a positive lens element and a positive meniscus lens element having its convex surface facing the image side, and a divergent fourth component consisting of a negative meniscus lens element having its convex surface facing the image side, the separation between said fourth and said third components being less than that between said first and said second components.

2. A wide angle lens as defined in claim 1, wherein the refractive index of the biconvex lens element of said second component is greater than that of the biconcave lens of the same component.

3. A wide angle lens as defined in claim 2, satisfying the following conditions:

$$|r_4| < r_3,$$

where $r_3$ represents the curvature radius of the object side surface of said biconvex lens element of said second component, and $r_4$ the curvature radius of the image side surface of said biconvex lens element.

4. A wide angle lens as defined in claim 2, wherein numerical data are as follows:

| total focal length: f = 100 | | aperture ratio 1:4.5 | |
|---|---|---|---|
| back focal distance: Bf = 69.673 | | | |
| r1 = 106.395 | d1 = 1.76 | nd1 = 1.57250 | vd1 = 57.5 |
| r2 = 26.461 | | | |
| | d2 = 17.86 | | |
| r3 = 35.943 | d3 = 27.23 | nd2 = 1.80218 | vd2 = 44.4 |
| r4 = −31.610 | d4 = 0.88 | nd3 = 1.67163 | vd3 = 38.8 |
| r5 = 45.204 | d5 = 3.31 | nd4 = 1.52000 | vd4 = 70.1 |
| r6 = 2425.579 | | | |
| | d6 = 3.64 | | |
| r7 = −254.686 | d7 = 9.37 | nd5 = 1.60717 | vd5 = 40.2 |
| r8 = −16.406 | d8 = 17.31 | nd6 = 1.71736 | vd6 = 29.5 |
| r9 = −45.424 | | | |
| | d9 = 11.03 | | |
| r10 = −25.391 | d10 = 1.65 | nd7 = 1.73350 | vd7 = 51.0 |
| r11 = −44.543 | Σd = 94.04 | | |

5. A wide angle lens as defined in claim 2, wherein numerical data are as follows:

| total focal length: f = 100 | | aperture ratio 1:4.5 | |
|---|---|---|---|
| back focal distance: Bf = 69.238 | | | |
| r1 = 108.684 | d1 = 1.97 | nd1 = 1.57250 | vd1 = 57.5 |
| r2 = 26.711 | | | |
| | d2 = 17.50 | | |
| r3 = 35.921 | d3 = 26.97 | nd2 = 1.80218 | vd2 = 44.4 |
| r4 = −32.868 | d4 = 0.92 | nd3 = 1.67163 | vd3 = 38.8 |
| r5 = 45.132 | d5 = 3.42 | nd4 = 1.52000 | vd4 = 70.1 |
| r6 = 1644.737 | | | |
| | d6 = 4.21 | | |
| r7 = −271.053 | d7 = 9.21 | nd5 = 1.60717 | vd5 = 40.2 |
| r8 = −16.487 | d8 = 17.37 | nd6 = 1.71736 | vd6 = 29.5 |
| r9 = −46.184 | | | |
| | d9 = 11.05 | | |
| r10 = −25.645 | d10 = 1.97 | nd7 = 1.73350 | vd7 = 51.0 |
| r11 = −43.786 | Σd = 94.57 | | |

6. A wide angle lens as defined in claim 2, wherein numerical data are as follows:

| total focal length: f = 100 | | aperture ratio 1:4.0 | |
|---|---|---|---|
| back focal distance: Bf = 70.197 | | | |
| r1 = 114.091 | d1 = 2.42 | nd1 = 1.56883 | vd1 = 56.0 |
| r2 = 28.333 | | | |
| | d2 = 19.09 | | |
| r3 = 37.348 | d3 = 28.03 | nd2 = 1.80218 | vd2 = 44.4 |
| r4 = −35.515 | d4 = 1.06 | nd3 = 1.67163 | vd3 = 38.8 |
| r5 = 45.455 | d5 = 3.79 | nd4 = 1.52000 | vd4 = 70.1 |
| r6 = 939.394 | | | |
| | d6 = 4.70 | | |
| r7 = −351.515 | d7 = 7.58 | nd5 = 1.56732 | vd5 = 42.8 |
| r8 = −18.121 | d8 = 18.33 | nd6 = 1.69895 | vd6 = 30.0 |
| r9 = −46.061 | | | |
| | d9 = 10.53 | | |
| r10 = −25.348 | d10 = 2.27 | nd7 = 1.58267 | vd7 = 46.5 |
| r11 = −46.874 | Σd = 97.8 | | |

* * * * *